US012632561B2

(12) United States Patent
Howe et al.

(10) Patent No.: US 12,632,561 B2
(45) Date of Patent: May 19, 2026

(54) VULNERABILITY CHAIN MAPPING USING GRAPH MODELING

(71) Applicant: International Business Machines Corporation, Armonk, NY (US)

(72) Inventors: Richard Howe, Mebane, NC (US); Nikki Elyse Robinson, Davidsonville, MD (US); Douglas Michael Foulds, Brooklin (CA)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 18/206,140

(22) Filed: Jun. 6, 2023

(65) Prior Publication Data

US 2024/0411890 A1     Dec. 12, 2024

(51) Int. Cl.
G06F 21/57 (2013.01)

(52) U.S. Cl.
CPC ...... G06F 21/577 (2013.01); G06F 2221/033 (2013.01)

(58) Field of Classification Search
CPC .. G06F 21/577; G06F 2221/033; G06F 40/30; G06F 16/24552; G06N 7/01; H04L 63/1433; H04L 41/145
See application file for complete search history.

(56) References Cited

U.S. PATENT DOCUMENTS

| | | |
|---|---|---|
| 9,871,815 B2 | 1/2018 | Ouchn |
| 10,979,446 B1 | 4/2021 | Stevens et al. |
| 2016/0248794 A1* | 8/2016 | Cam .................. H04L 63/1433 |

(Continued)

FOREIGN PATENT DOCUMENTS

| | | |
|---|---|---|
| CN | 106850607 B | 9/2019 |
| CN | 112114579 A | 12/2020 |

(Continued)

OTHER PUBLICATIONS

Barrett, Malcolm, "An Introduction to Directed Acyclic Graphs", R Foundation, https://cran.r-project.org/web/packages/ggdag/vignettes/intro-to-dags.html, Oct. 29, 2022, 12 pages.

*Primary Examiner* — Catherine Thiaw
(74) *Attorney, Agent, or Firm* — CANTOR COLBURN LLP; Anthony Mauricio Pallone

(57) ABSTRACT

Mechanisms are provided for identifying vulnerability chains in a computing system. Computer system vulnerability characteristics for a plurality of computer system vulnerabilities from a vulnerability registry are retrieved. For each vulnerability, a threat score is calculated indicating a level of risk of the vulnerability to security of the computing system. Based on the vulnerability characteristics and the threat score, a directed acyclic graph (DAG) data structure is generated having a plurality of vulnerability chains, each vulnerability chain having a plurality of vulnerabilities, represented as nodes of the DAG, linked to each other from a root node to a terminating node. Links of the DAG have weights corresponding to a function of the threat scores of the nodes directly connected by the link. A graphical representation of the DAG is generated that depicts the weights of the links to thereby represent relative threat of the vulnerabilities linked by the links.

20 Claims, 5 Drawing Sheets

(56)                 References Cited

U.S. PATENT DOCUMENTS

| | | | |
|---|---|---|---|
| 2017/0046519 A1* | 2/2017 | Cam ........................ | G06N 7/01 |
| 2020/0175174 A1 | 6/2020 | Bakalli et al. | |
| 2021/0103487 A1* | 4/2021 | Rosales .................... | G06N 7/01 |
| 2021/0288992 A1* | 9/2021 | Attar ................... | H04L 41/0879 |
| 2022/0191230 A1* | 6/2022 | Morgan ................. | H04L 63/20 |
| 2022/0201014 A1 | 6/2022 | Saha et al. | |
| 2022/0210202 A1* | 6/2022 | Crabtree .............. | G06F 21/577 |
| 2022/0407891 A1* | 12/2022 | Albanese ............. | H04L 63/205 |
| 2023/0229788 A1* | 7/2023 | Pieno ............... | G06F 16/24552 |
| | | | 726/25 |
| 2023/0328094 A1* | 10/2023 | Brown ............... | H04L 63/1433 |
| | | | 726/23 |
| 2024/0143924 A1* | 5/2024 | Pfante .................... | G06F 40/30 |
| 2024/0146755 A1* | 5/2024 | Ungureanu ........... | H04L 41/145 |

FOREIGN PATENT DOCUMENTS

| | | | | | |
|---|---|---|---|---|---|
| CN | 112270125 A | 1/2021 | | | |
| CN | 112329377 A | 2/2021 | | | |
| CN | 110933083 B | 4/2022 | | | |
| CN | 113949570 B | 9/2022 | | | |
| WO | WO200070463 A1 | 11/2000 | | | |
| WO | WO 2022066551 | * | 3/2023 | ............. | G06F 21/57 |
| WO | WO-2022066551 A1 * | 3/2023 | ........... | G06F 21/552 |

* cited by examiner

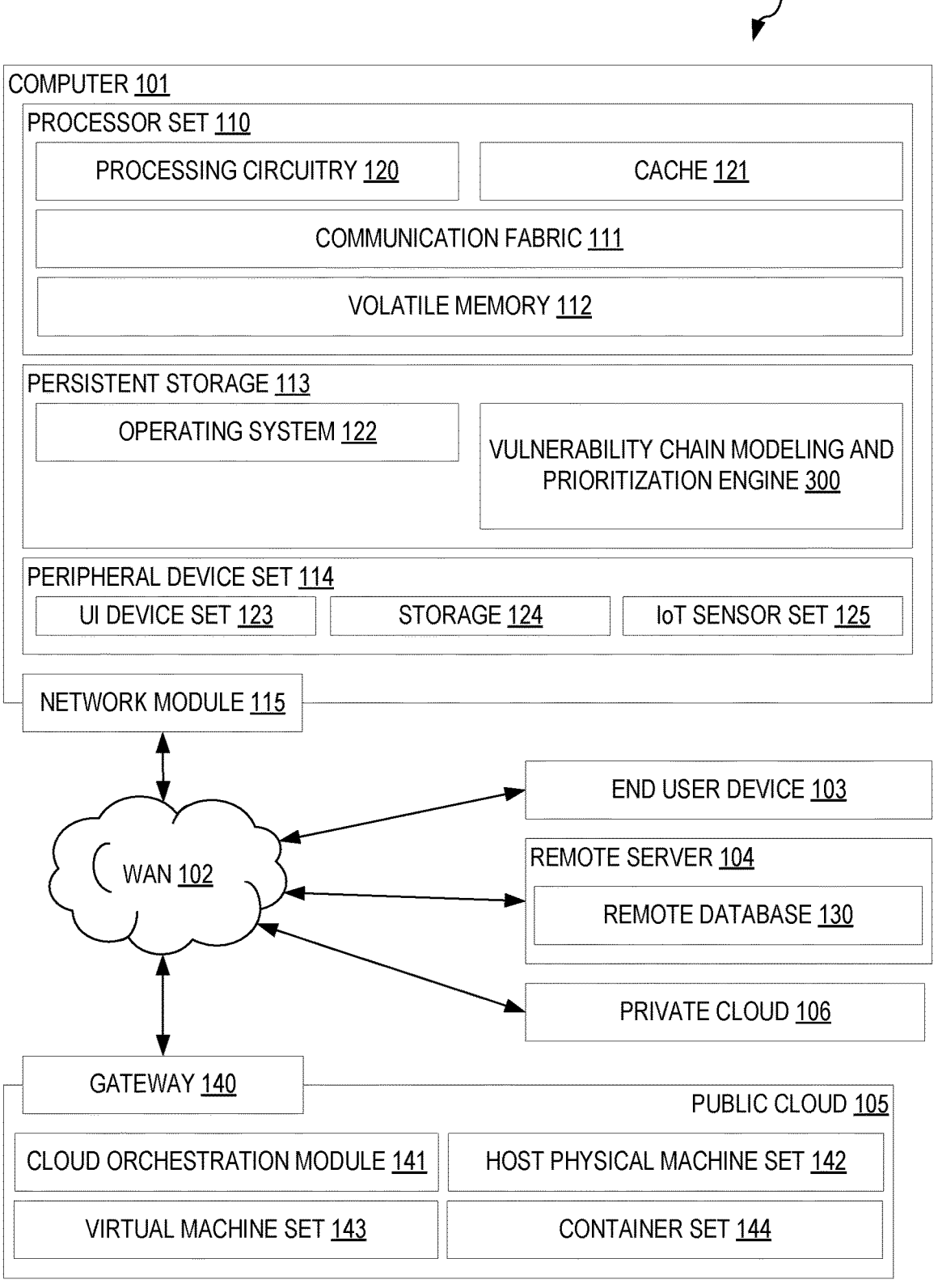

100

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122      VULNERABILITY CHAIN MODELING AND PRIORITIZATION ENGINE 300

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

*FIG. 1*

VULNERABILITY CHAIN MAPPING USING GRAPH MODELING

BACKGROUND

The present application relates generally to an improved data processing apparatus and method and more specifically to an improved computing tool and improved computing tool operations/functionality for vulnerability chain mapping using graph modeling.

The security of computing systems is a significant issue in the information technology age, with adversaries constantly attempting to exploit vulnerabilities in the security of computing systems to gain access to confidential or personal data and/or access resources surreptitiously. Vulnerability management and remediation is overly complex, given the sheer number of vulnerabilities identified and reported each day. With numerous vulnerabilities across different Operating System (OS) levels, hardware, software, devices, cloud configurations, etc., it is increasingly difficult to get a handle on prioritization of such vulnerabilities. With the increased complexity of multi-cloud and hybrid cloud deployments with regard to maintaining on-premises systems, organizations need a better method for detecting vulnerabilities and understanding which ones are the actual threats.

Currently, vulnerability registries are provided where organizations and individuals can register detected vulnerabilities so as to share information about these vulnerabilities in computing systems as well as collaborate on solutions to these vulnerabilities. For example, the National Institute of Standards and Technology (NIST) provides a national vulnerability database (NVD) where entries in the NVD have a corresponding Common Vulnerabilities and Exposure (CVE) identifier for identifying specific vulnerabilities. While this registry provides an important tool for informing entities of discovered vulnerabilities and solutions, the entries are independent of one another, i.e., on an individual vulnerability basis.

The handling of vulnerabilities in computing systems is made even more complex when one considers that many adversaries are now taking advantage of vulnerability chaining. Vulnerability chaining is the exploitation of two or more vulnerabilities to implement an attack on a computing system and thereby impact the confidentiality, availability, or integrity of data in an unintended manner. It is difficult to understand vulnerability chaining attacks within a system context when these vulnerabilities often interact and affect system components along multiple attack vectors, sometimes at substantially the same time. Without understanding how vulnerabilities interact, together within threat intelligence and modeling tools to model these vulnerability chains, organizations cannot understand what vulnerabilities to remediate first.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for identifying vulnerability chains in a computing system. The method comprises retrieving computer system vulnerability characteristics for a plurality of computer system vulnerabilities from a vulnerability registry. The method also comprises determining, for each computer system vulnerability, a threat score indicating a level of risk of the vulnerability to security of the computing system. In addition, the method comprises generating, based on the computer system vulnerability characteristics and the threat score, a directed acyclic graph data structure. The directed acyclic graph (DAG) data structure comprises a plurality of vulnerability chains, wherein each vulnerability chain comprises a plurality of computer system vulnerabilities, represented as nodes of the DAG data structure, linked to each other from a root node to a terminating node. Links of the DAG data structure have weights corresponding to a function of the threat scores of the nodes directly connected by the link. The method further comprises generating a graphical representation of the DAG data structure. The graphical representation of the DAG data structure depicts the weights of the links to thereby represent relative threat of the vulnerabilities linked by the links.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system environment in which aspects of the illustrative embodiments may be implemented and at least some of the computer code involved in performing the inventive methods may be executed;

DETAILED DESCRIPTION

Figure 2:
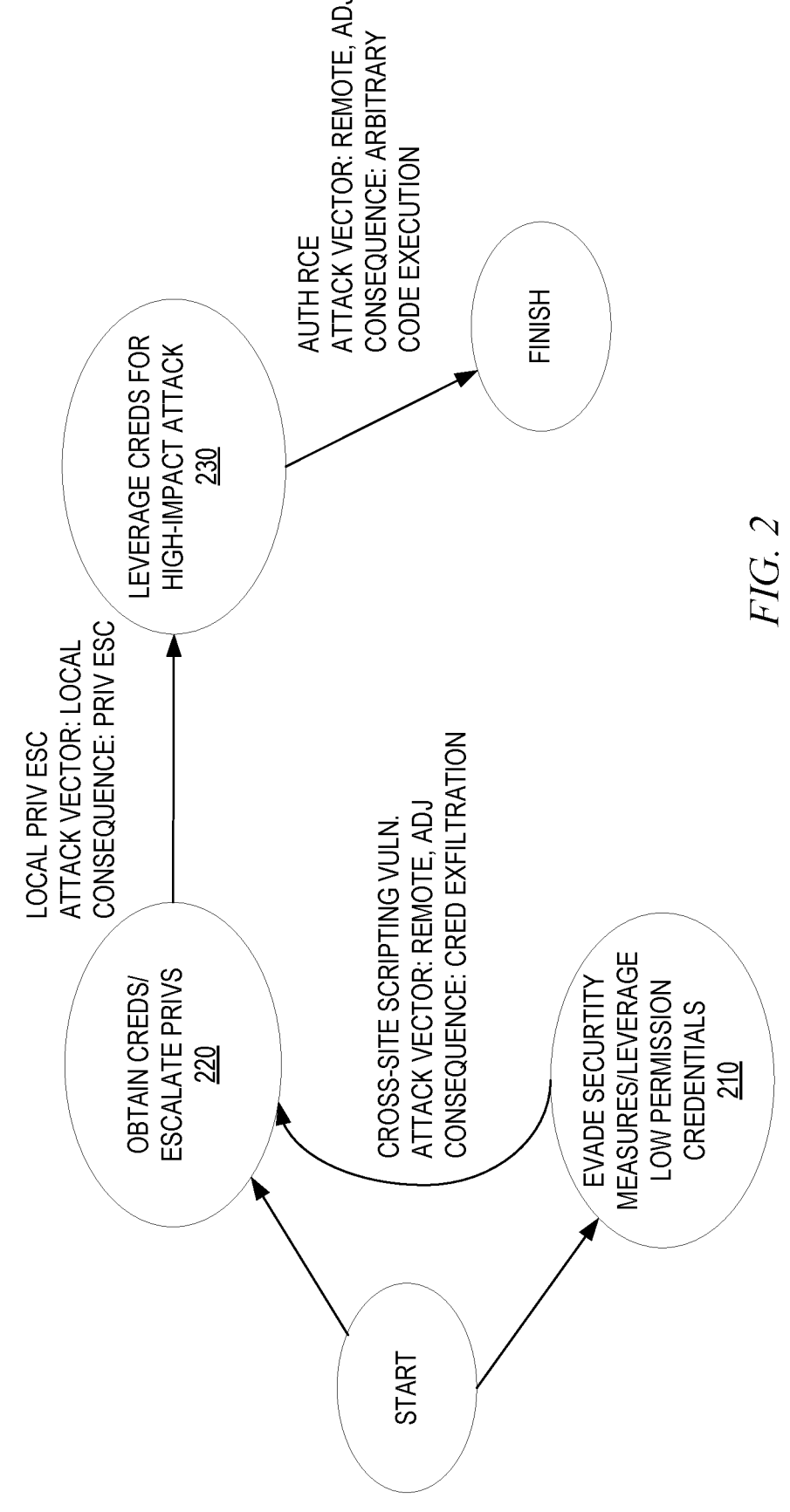
FIG. 2 is an example diagram of a process workflow that exploits a vulnerability chain, which may be identified and modeled by the mechanisms of the illustrative embodiments.

Organizations, such as the National Institute of Standards and Technology (NIST) and Forum of Incident Response and Security Teams (FIRST), Inc., who created the Common Vulnerability Scoring System (CVSS), define vulnerability chaining as the combination of one or more vulnerabilities, which can impact the CVSS score. For example, multiple low severity vulnerabilities can be combined to create a highly exploitable critical vulnerability. However, with current vulnerability reporting mechanisms, vulnerabilities are still considered on an individual basis, e.g., individual low severity vulnerabilities. Such mechanisms are not able to identify the interactions between vulnerabilities, such as in the chaining of vulnerabilities to create a more critical vulnerability situation than each individual vulnerability on its own would represent. As a result, it is difficult to prioritize vulnerability remediation actions and resource expenditure to achieve a greatest positive result, e.g., breaking vulnerability chains.

The illustrative embodiments provide improved computing tools and improved computing tool functionality/operations for modeling vulnerability chains using graph data structures. The illustrative embodiments are specifically directed to solving the issues of vulnerability chain-based attacks on computing systems and provides a mechanism to visualize the vulnerability chain and prioritize remediation efforts to break these vulnerability chains. The solution provided by the illustrative embodiments, provides an efficient mechanism to identify vulnerability chains, based on vulnerability metadata that is made public at the time of the vulnerability disclosure, such as may be provided in a vulnerability registration system, where the identification of the vulnerability chains implements Directed Acyclic Graphs (DAGs).

The DAG displays assumptions about the relationship between variables (often called nodes in the context of graphs) which, in the illustrative embodiments, is used to determine vulnerability chaining relationships by correlating characteristics of the individual vulnerabilities. That is, nodes in the DAG represent individual vulnerabilities, and edges represent the characteristic relationships between these individual vulnerabilities. The illustrative embodiments link vulnerabilities that, by themselves, may have a low impact if exploited, but if exploited together, a given set of vulnerabilities could result in a much larger impact. These characteristics are fundamental characteristics that are extracted and extrapolated from CVD metadata from one or more vulnerability registration systems, e.g., NVD from NIST. Various vulnerability characteristics, such as vulnerability impact, attack vector, and authentication requirements, may be utilized to correlate individual vulnerabilities into vulnerability chains.

By linking each vulnerability with related vulnerabilities in a DAG based on fundamental characteristics from the CVE metadata, a tree-like data structure is generated in the form of the DAG. The edges of the DAG are weighted using a risk-based scoring algorithm, examples of which include Exploit Prediction Scoring System (EPSS) available from FIRST, Inc., IBM X-Force Threat Score available from International Business Machines (IBM) Corporation, of Armonk, New York, or CVSS. The resulting DAG may be used to visualize the vulnerability chains. However, the DAG also provides a mechanism by which to execute analysis algorithms to automatically identify and/or prioritize vulnerabilities that, if addressed by remediation efforts, would provide a greatest impact on computing system security and reducing the likelihood that the computing system will be vulnerable to attack. For example, the DAG may be analyzed using a depth-first-search, breadth-first-search, or other graph analysis algorithms, to enumerate all vulnerability chains in the DAG. This allows for quickly enumerating all paths within the DAG which represent all vulnerability chains, but also allows for sorting paths from largest to smallest. With such a sorting, the vulnerability chains that pose the greatest risk to a computer system of an organization may be identified, e.g., the vulnerability chains with the greatest accumulated risk scores may be considered the greatest risk to the organization. Moreover, the longer the vulnerability chain, the more likely that targeting a vulnerability within the vulnerability chain will break the vulnerability chain and achieve the greatest improvement in security.

This illustrative embodiments can actively target vulnerabilities that need to be patched that would normally be overlooked. Due to the nature of the DAG, the improved computing tool and improved computing tool functionality/operations may be used by security teams for vulnerability maintenance or compliance to help drive vulnerability remediation efforts. In some illustrative embodiments, the improved computing tool and improved computing tool functionality/operations may be integrated into the core logic of the Chief Information Security Officer (CISO) organization's data lake to help the CISO organization, Chief Information Officers (CIO), and Business Information Security Officer (BISO) teams to assist with identifying problem areas in the organization that require additional attention when it comes to patching for vulnerabilities. Due to the modularity of the illustrative embodiments, it may be implemented as a plugin for other cyber security tools, such as attack surface management computing tools, to assist with identifying vulnerability chains.

In accordance with some illustrative embodiments, in generating the DAG, a finite state machine is provided to associate vulnerabilities ingested at initial runtime based on vulnerability characteristics, such as attack vector, impact on confidentiality, integrity, and availability (CIA) triad, and consequence of exploitation. CVEs with a local attack vector, or vulnerabilities that result in a security bypass or credential exfiltration would be the first link in the vulnerability chain. CVEs that result in privilege escalation, further credential dumping, or data enumeration serve as intermediate links in the vulnerability chain. Finally, CVEs that result in authenticated code execution, command injection, or file upload will serve as the final link in the vulnerability chain. CVEs are nodes of the DAG with relationships between the CVEs being the edges of the DAG. As such, the edges are based on matching or related characteristics of the CVEs. A linked-list data structure is used as the underlying data structure to associate each link between the nodes. Each node in the linked list contains the metadata for a given CVE, as well as a pointer to the next node in the vulnerability chain. This ensures that parsing each vulnerability chain results in a runtime complexity of $O(n)$, where n is the number of nodes in a vulnerability chain. Once vulnerability chain associations are complete, the graph may be built by using the CVEs themselves as the nodes of the graph, and the weighted edges calculated based on the combined threat score of the two connected CVEs.

The graph may then be used as a vulnerability chain model that can be used to evaluate CVEs that impact a given computer system. That is, a list of individual CVEs that impact a given system may be input to the vulnerability chain model, and based on the vulnerability chain model, the vulnerability chains in the input listing of CVEs may be identified and visualized. Moreover, the priorities of these vulnerability chains may be determined based on the edge scoring and presented to a user for identification of the most important vulnerability chains to address with remediation efforts and resources. Thus, the vulnerabilities within vulnerability chains that, if resolved, would represent a greatest impact on the security of the computing system may be identified, as well as recommended remediation operations based on the type of the vulnerability if such remediation operations are known, e.g., in a vulnerability registry.

Thus, the mechanisms of the illustrative embodiments provide an improved computing tool and improved computing tool functionality/operations that may automatically identify, from a vulnerability registry system, vulnerability chains and build a graph based model, e.g., a DAG based model, that may be used to evaluate lists of vulnerabilities for a given organization's computing system. That is, from the graph based model, a DAG for an organization specific computing system and its list of vulnerabilities may be generated and prioritized so as to inform the organization of the vulnerability chains that may represent significant vulnerability risks to the organization's computing system. The mechanisms of the illustrative embodiments further provide tools for automatically identifying the vulnerabilities that, if remediated, would provide a greatest impact on security of the organizations' computing system. In some cases, the mechanisms of the illustrative embodiments may automatically implement patches or remediation actions to address the prioritized vulnerabilities and break the vulnerability chains.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides mechanisms for identifying vulnerability chains and generating a graph based vulnerability chain model from individual vulnerability information in vulnerability reporting registries and identifying of priorities for vulnerability chains. The improved computing tool implements mechanism and functionality, such as vulnerability chain modeling computing tool, which cannot be practically performed by human beings either outside of, or with the assistance of, a technical environment, such as a mental process or the like. The improved computing tool provides a practical application of the methodology at least in that the improved computing tool is able to identify vulnerability chains and model the vulnerability chains as a graph based vulnerability chain model that may be executed on an organizations' list of vulnerabilities to identify vulnerability chains and prioritize them for remediation actions.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as vulnerability chain modeling and prioritization (VCMAP) engine 300. In addition to VCMAP engine 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and VCMAP engine 300, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in VCMAP engine 300 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in VCMAP engine 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a VCMAP engine 300. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates identification of vulnerability chains, modeling the vulnerability chains, and executing the vulnerability chain model on lists of individual vulnerabilities of an organization's computing system to identify the specific vulnerability chains potentially affecting the organization's computing system and prioritizing those vulnerability chains for remediation actions.

As noted above, many times attackers may utilize chains of vulnerabilities, which individually may pose a low level of risk, but when combined may represent a more critical vulnerability to a computing system. It is important to be able to identify such vulnerability chains in order to improve the security of computing systems and harden those computing systems against attacks exploiting such vulnerabilities. In particular, it is beneficial to identify such vulnerability chains and target remediation actions, patching, or the like, to address vulnerabilities within the vulnerability chains posing the highest risk so as to break the vulnerability chains and achieve a greatest impact on computing system security.

FIG. 2 is an example diagram of a process workflow that exploits a vulnerability chain, which may be identified and modeled by the mechanisms of the illustrative embodiments. As shown in FIG. 2, an attacker may start an attack by first evading security measures and leveraging low permission credentials 210 or by obtaining credentials and escalating privileges 220. In the case of first leveraging low permission credentials 210, a cross-site scripting vulnerability may be used with the consequence being a credential exfiltration. The obtaining of the credentials and escalation of privileges is a local privilege escalation that results in the privilege escalation meaning that the attacker exploits vulnerabilities to gain access to the computing system resources with elevated access rights or privileges. Having obtained the escalated privileges, the attacker then leverages the acquired credentials for performing a high impact attack 230. The consequence of the high impact attack 230 may be to execution of arbitrary code, such as a computer virus, execution of code that the attacker should not be able to access, accessing sensitive data, or otherwise performing unwanted actions or achieving unwanted access to computing system resources. It can be seen that each individual vulnerability exploit 210-230 may by itself not indicate a high risk, however, when viewed as a whole may be considered to be a high risk vulnerability chain.

Figure 3:
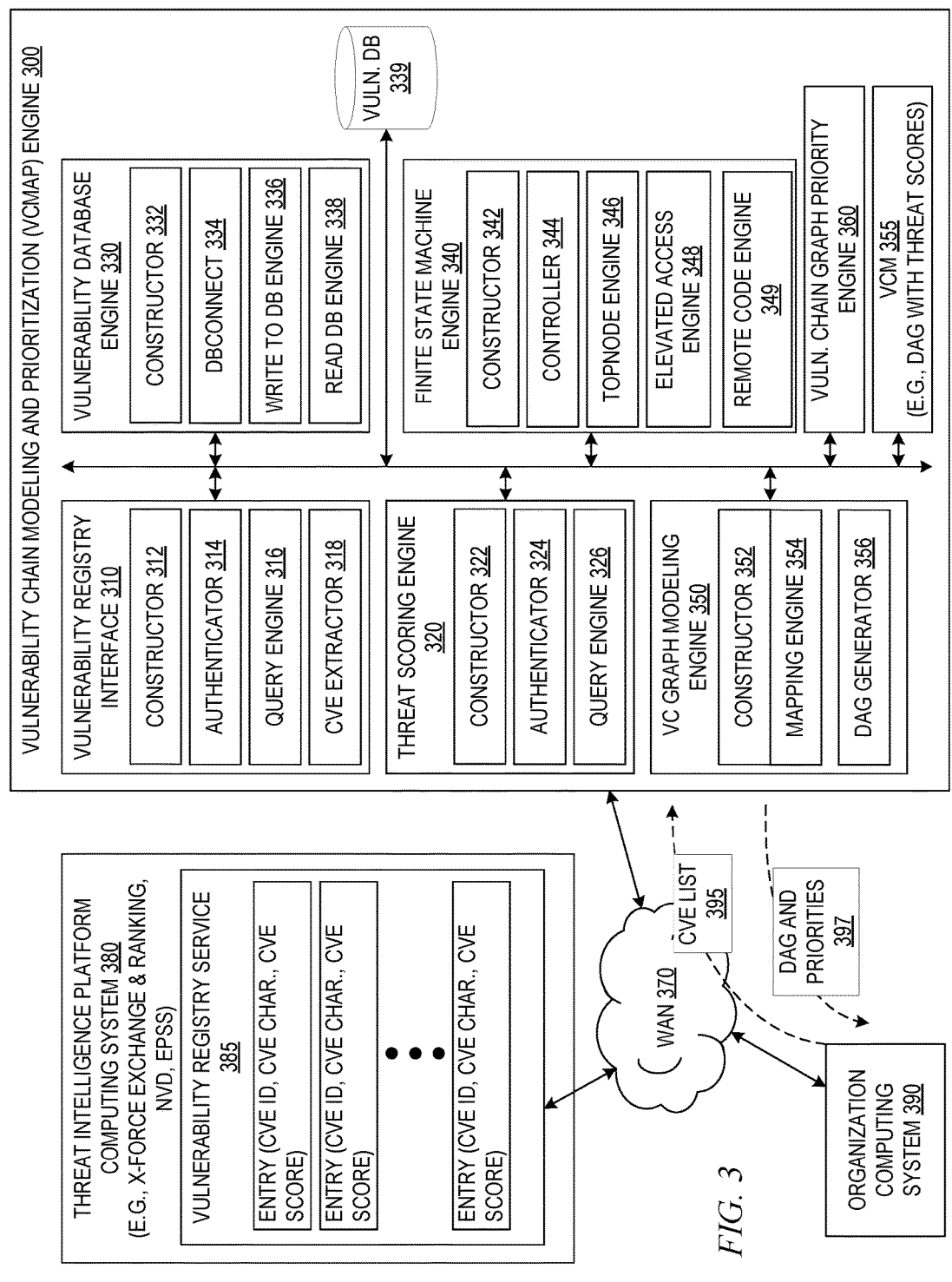
FIG. 3 is an example block diagram illustrating the primary operational components of a vulnerability chain modeling and prioritization (VCMAP) engine in accordance with one illustrative embodiment.

FIG. 3 is an example block diagram illustrating the primary operational components of a vulnerability chain modeling and prioritization (VCMAP) engine in accordance with one illustrative embodiment. The operational components shown in FIG. 3 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that security vulnerabilities are identified, modeled, and prioritized so as to improve the security of computing systems, and minimize risk of vulnerabilities through prioritized application of remedial actions and resources taking into account vulnerability chains. Such operations cannot be practically performed by human beings as a mental process and is not directed to organizing any human activity.

As shown in FIG. 3, the primary operational components of the VCMAP engine 300 comprises a vulnerability registry interface 310, a threat scoring engine 320, a vulnerability database engine 330, a finite state machine engine 340, a vulnerability chain graph modeling engine 350 that generates a learned vulnerability chain model (VCM) 355, and a vulnerability chain graph prioritization engine 360. The VCMAP engine 300 may access Common Vulnerabilities and Exposure (CVE) entries of a vulnerability registry service computing system 385, of a threat intelligence platform computing system 380, e.g., IBM® X-Force®, via one or more data networks 370. The VCMAP engine 300 may receive a list of CVEs 395 for an organization's computing system 390 and may execute the learned VCM 355 on the list of CVEs 395 to generate a graph representation 397 of the organization's vulnerability chains and prioritization of these vulnerability chains for remedial actions and resource allocation.

For purposes of this description, the elements of the VCMAP engine 300 will be described as being implemented using classes and methods of an object oriented programming language, e.g., Java™ or the like, but the illustrative embodiments should not be considered to be limited to any specific programming language or implementation. Other programming language and implementations of the functionality described herein are intended to be within the spirit and scope of the present invention. In addition, while the illustrative embodiments will be described as being implemented as part of, or as interacting with, the IBM® X-Force® Exchange threat intelligence platform, available from IBM Corporation of Armonk, New York, the illustrative embodiments are not limited to such, and may be implemented with other threat intelligence platforms without departing from the spirit and scope of the present invention.

The VCMAP engine 300 operates in conjunction with, or as part of, a threat intelligence platform 380, such as IBM® X-Force® Exchange, which includes a vulnerability registry service 385. The vulnerability registry service 385 maintains a database of reported vulnerabilities. Each vulnerability may be represented as an entry data structure comprising Common Vulnerability and Exposure (CVE) information, such as a CVE identifier, CVE characteristics, and CVE score, etc. As each entry corresponds to a CVE, the entry may be referred to herein as a CVE.

The vulnerability registry interface 310 may implement computer executable logic that operates to pull down a list of all CVEs, as well as CVE characteristics, such as attack vector and impact on CIA triad, from the vulnerability registry service computing system 380. In some illustrative embodiments, the logic of the vulnerability registry interface 310 may implement a constructor 312, an authenticator 314, a query engine 316, and a CVE extractor 318. These elements may be implemented as methods, for example, as follows.

The constructor 312 comprises logic that is used to instantiate a threat intelligence platform, such as an IBM® X-Force® Exchange class, i.e., the class that comprises methods for pulling down the list of CVEs, CVE characteristics, and the like, as well as define the variables named headers and base_url. The variable named headers represents the header metadata, e.g., the HTTP authorization header, used to execute requests, e.g., GET requests, against the Exchange Application Programming Interface (API). The variable named base_url represents the base, or root Uniform Resource Locator (URL) used to make API calls, e.g., Representational State Transfer (REST) API calls.

The authenticator 314 may comprise logic, such as a private method named "authenticate", which is used to authenticate the VCMAP engine 300 with the threat intelligence platform, such as the IBM® X-Force® Exchange, with the exchange API, e.g., an IBM® X-Force® Exchange REST API. For example, this method may read in the IBM® X-Force® Exchange API key and password which are stored as environment variables. The method returns a decoded authentication key provided by the API, e.g., a base 64 decoded authentication key.

The query engine 316 comprises logic, such as a method called "apiQuery", which is used to handle pagination and execute GET requests against the threat intelligence platform API, e.g., IBM® X-Force® Exchange REST API. The API may receive a string representation of a time stamp that is passed in the initial API call. The API returns all vulnerabilities disclosed before the date of the time stamp. In some illustrative embodiments, a hardcoded timestamp, e.g., 1970-01-01T00:00:00Z, is provided to designate the date that the vulnerability was discovered and made public. The apiQuery method returns a data frame containing all Common Vulnerabilities and Exposure (CVEs), i.e., entries in the vulnerability registry service 385, and their CVE characteristics, i.e., threat vector information and information characterizing the effect, or impact, of the vulnerability on the confidentiality, integrity, and availability (CIA) triad.

The CVE extractor 318 comprises logic, such as a private method called "parseOutput" that operates to parse the received data frame and extract the CVE characteristics. For example, the parseOutput method may receive raw JavaScript Object Notation (JSON) data that is returned from a GET request and can parse the data to extract CVE characteristics. The parseOutput method returns a list of dictionaries, where each dictionary contains a CVE code, as well as each CVE characteristic, such as in the format of key-value pairs.

The threat scoring engine 320 comprises logic, such as a "ThreatScore" class, which is used to pull down the threat intelligence platform's threat score, e.g., IBM® X-Force® Threat Score information as consequence of exploitation, e.g., the CVE score from the vulnerability registry service 385. In some illustrative embodiments, the threat scoring engine 320 comprises a constructor 322, an authenticator 324, and a query engine 326. In some illustrative embodiments, these elements of the threat scoring engine 320 may be implemented as methods of the ThreatScore class. For example, the constructor 322 may be implemented as a method used to instantiate the ThreatScore class as well as define the variables named base_url and headers, similar to the constructor 312 of the vulnerability registry interface 310. In this case, the variable named headers represents the HTTP authorization header used to execute GET requests against the ThreatScore API. The variable named base_url represents the base, or root URL, used to make REST API calls.

The authenticator 324 comprises logic, such as a private method named "authenticate", that is used to authenticate the VCMAP engine 300 with the ThreatScore REST API. The authenticate method reads in the ThreatScore API key and regID which are stored as environment variables. The authenticate method returns a authentication key provided by the API.

The query engine 326 comprises logic, such as a method named "Query", that is responsible for handling pagination and executing GET requests against the ThreatScore API. The method returns a data frame containing all CVEs, their threat score, or CVE score from the entries in the vulnerability registry service 385, and consequences of exploitation, with this information being obtained from the vulnerability registry service 385 of the threat intelligence platform computing system 380.

The vulnerability database engine 330 comprises logic, such as a "Database" class, that is used to store and retrieve the final results retrieved from the vulnerability registry interface 310 and threat scoring engine 320, e.g., from the Exchange and ThreatScore classes mentioned above, within a vulnerability database 339, such as a MySQL database. In some illustrative embodiments, the vulnerability database engine 330 comprises a constructor 332, database connect engine 334, a write to database engine 336, and a read database engine 338. In some illustrative embodiments, these elements 332-338 may be implemented as methods of the "Database" class. For example, the constructor 332 method is used to instantiate the Database class as well as define a variable called engine, which represents a database engine and allows for reading and writing data from/to the vulnerability database 339, e.g., a MySQL database. The database connect engine 334 comprises logic, such as a private method called "dbConnect", which detects whether the VCMAP engine 300 has ever been run before and then returns an instance of a database engine. If the automation has not been run before, a database schema called vulns is created.

The write to database engine 336 comprises logic, such as a method called "writeToDatabase", which receives the final output from the vulnerability registry interface 310 and threat scoring engine 320, e.g., the Exchange and ThreatScore classes, and writes it to the vulnerability database 339. The read database engine 338 comprises logic, such as a method called "readFromDatabase", that reads a table from the vulnerability database 339. This "readFromDatabase" method is used to read the threat score and CVE information, e.g., the ThreatScore and Exchange API information, from the vulnerability database 339.

The finite state machine (FSM) 340 comprises logic, such as an FSM class, used to represent a finite state machine. This finite state machine is responsible for creating a Dynamic Acyclic Graph (DAG) from a linked list, determining the position of each node within the DAG, and setting the value of each of the edges of the graph based on the aggregated risk score of the two nodes connected by that edge. The FSM 340 comprises a constructor 342, a controller 344, a top node engine 346, an elevated access engine 348, and a remote code engine 349. In some illustrative embodiments, these elements 342-349 may be implemented as methods of the FSM class. Thus, for example, the constructor 342 comprises logic, such as a constructor method, that creates an instance of the FSM class, as well as instantiates a variable named dag that represents the final DAG, and a variable named input that represents the input linked list containing the combined data from the vulnerability registry interface 310 and threat scoring engine 320, as stored in the vulnerability database 339, e.g., the Exchange and ThreatScore APIs data.

The controller 344 comprises logic, such as a method called "controller", that handles the transitions between states and checks for a final state. When a final state is detected, the controller method takes the final state, which is a DAG, and assigns the value to the dag variable that is instantiated by the constructor 342. The state information is obtained from the finite state machine modeling a computing system process or program, where the state is the literal state that the process or program is in at any given time. One of the states in the finite state machine is labeled as the "final state." As the code runs and the data propagates throughout the finite state machine, the DAG is slowly created. Once the "final state" is reached, the DAG has been completed.

The top node engine 346 comprises logic, such as a method called "topNode", that checks whether a given vulnerability would provide an attacker with minimal access to a system that could allow them to gain an initial foothold. This topNode method checks for vulnerabilities that would represent the first link in a vulnerability chain, i.e., vulnerability chain initial vulnerabilities. These checks may look at vulnerability characteristics, such as attack vector, impact on CIA triad, and consequence of exploitation, and apply rules/logic to determine whether a vulnerability has characteristics indicative of an initial vulnerability in a vulnerability chain. In some illustrative embodiments, CVEs that this method checks for may include CVEs that are of a security bypass, SQL injection, and cross-site-scripting vulnerability type as specified in CVE characteristics. Of course, in other illustrative embodiments, or implementations, other types of vulnerabilities may be checked for as well as these, or in replacement of these, vulnerability types without departing from the spirit and scope of the present invention.

The elevated access engine 348 comprises logic, such as a method called "isElevatedAccess", that checks whether a given vulnerability would provide an attacker with the ability to either escalate privileges on a system or exfiltrate data that would allow them to either further compromise a system or execute arbitrary code on a system, i.e., elevated access vulnerabilities. Again, such checks may be performed with regard to vulnerability characteristics such as attack vector, impact on CIA triad, and consequences of exploitation, for example. In some illustrative embodiments, the CVEs that the isElevatedAccess method checks for include local privilege escalation and file and directory traversal type vulnerabilities, as may be specified in the CVE characteristics. Of course, in other illustrative embodiments, or implementations, other types of vulnerabilities may be checked for as well as these, or in replacement of these, vulnerability types without departing from the spirit and scope of the present invention.

The remote code engine 349 comprises logic, such as a method called "isCodeExec", which checks whether a given vulnerability allows for authenticate or unauthenticated remote code execution, i.e., remote code vulnerabilities. Again, such checks may be performed with regard to vulnerability characteristics such as attack vector, impact on CIA triad, and consequences of exploitation, for example. The isCodeExec method checks for vulnerabilities that would be the last link in the vulnerability chain.

The top node engine 346, elevated access engine 348, and remote code engine 349 operate on the CVE characteristics obtained from the vulnerability registry service 385 via the vulnerability registry interface 310. These CVE characteristics include a vulnerability attack vector, an impact on CIA triad, and a consequence of exploitation. The vulnerability attack vector informs the VCMAP engine 300 whether a vulnerability can be exploited remotely (from a remote system) or locally, i.e., one must already have access to the vulnerable system. The impact on the CIA triad is a component of the CVE characteristics that is used to determine whether a given vulnerability impacts an asset's confidentiality, integrity, and/or availability. This component is used to detect, for example, denial-of-service vulnerabilities. While such vulnerabilities can create a loss of availability for a service or asset, they do not allow a bad actor to exfiltrate sensitive data or execute arbitrary code on a computing system. The consequence of exploitation CVE characteristic informs the VCMAP engine 300 if an exploitation allows a bad actor to execute arbitrary code on a computing system, gain escalated privileges, provides read/write access to protected files, or the like.

CVEs with a local attack vector, or vulnerabilities that result in a security bypass or credential exfiltration are likely a first link in the vulnerability chain, as these vulnerabilities have a remote or adjacent attack vector used to establish an initial foothold on a given computing system. CVEs that result in a privilege escalation, further credential dumping, or data enumeration will serve as intermediate links in the chain as they impact access confidentiality and integrity, and would elevate the privileges of a bad actor. Finally, CVEs that result in authenticated code execution, command injection, or file upload will serve as the final link in the vulnerability chain. The engines 346-349 operate to identify these CVEs and generate a DAG that represents these vulnerability chains and their associated threat scores, or vulnerability chain risk.

The vulnerability chain graph modeling engine 350 comprises logic, such as a Mapping class, that is used to read in final output from the vulnerability registry interface 310 and threat scoring engine 320, as may be stored in the vulnerability database 339, e.g., data from the Exchange and ThreatScore classes stored in the MySQL database, and maps the threat score (CVE score), CVE, and CVE characteristics, as well as creates a linked list data structure from that mapping, and convert the linked list into a Dynamic Acyclic Graph (DAG). The vulnerability chain graph modeling engine 350 comprises a constructor 352, a mapping engine 354, and a DAG generator 356. In some illustrative embodiments, these elements 352-356 may be implemented as methods of the Mapping class.

For example, the constructor 352 comprises logic, such as a constructor method, which instantiates the Database class as well as defines a variable called db_inst that defines an instance of the Database class. The mapping engine 354 comprises logic, such as a method called "mapCVEs", that is used to read in two data frames containing the final output from the vulnerability registry interface 310 and the threat scoring engine 320, e.g., the Exchange and ThreatScore classes, such as from the vulnerability database 339. The mapCVEs method maps the threat score and consequence of exploit data from the threat scoring engine 320, as stored in the vulnerability database 339, with the CVE and CVE characteristic data, as obtained from the vulnerability registry interface 310, e.g., the Exchange API, and stored in the vulnerability database 339. A single linked list containing the combined data is returned by the mapCVEs method, or mapping engine 354.

The DAG generator 356 comprises logic, such as a method called "generateDAG", which takes the data frames from the mapping engine 354, e.g., mapCVE method output, and ingests the data frames into an instance of the FSM class. The output of the DAG generator 356 is a DAG that links and associates vulnerabilities based on CVE characteristics, consequence of exploit, and risk (threat or CVE score). That is, for example, the CVE characteristics may be matched between one CVE and another to demonstrate that one CVE may lead to a second CVE, such as by analyzing the specific vulnerability characteristics, e.g., attack vector, impact on CIA triad, and consequences of exploitation.

The vulnerability chain (VC) Graph modeling engine 350 generates a vulnerability chain model (VCM) 355 in the form of the output DAG. The VCM 355 may then be processed by the vulnerability chain graph priority engine 360 based on the vulnerability chain risk scores, which are a combination of the threat or CVE scores of the links along the chain from one node to another. Thus, a vulnerability chain risk, in some illustrative embodiments, is the accumulation of the individual threat/CVE scores of the links in the vulnerability chain. In other illustrative embodiments, the vulnerability chain risk may be a function of these threat/CVE scores, such as a weighted function in which different types of links may be weighted more heavily than others, an average of the threat/CVE scores, a maximum value of the threat/CVE scores, or any other function of threat/CVE scores of the links of the vulnerability chain.

In some illustrative embodiments, the vulnerability chain graph priority engine 360 operates on a CVE list 395 provided by an organization computing system 390 specifying the CVEs that are of concern to the particular organization, e.g., CVEs of vulnerabilities that the particular organization computing system 390 may have encountered, or believes may be of particular concern. For example, the organization may have a security system that itself creates a finite state machine that represents the CVEs encountered by the organization's computing system 390 and this finite state machine may specify the CVE list 395. In some illustrative embodiments, an authorized entity, such as a system administrator, may input a CVE list 395 for the organization computing system.

The received CVE list 395 may be compared to the CVEs in the VCM 355 to identify the vulnerability chains that correspond to the CVEs in the CVE list 395, e.g., any vulnerability chain that has a CVE matching a CVE in the CVE list 395 may be identified. The resulting DAGs for the identified vulnerability chains may then be generated along with the corresponding vulnerability chain threat scores to generate the vulnerability chain risks. Based on the vulnerability chain risks, the vulnerability chains may be prioritized relative to one another.

With these mechanisms as described above, in some illustrative embodiments, the following implementation methodology is performed by the VCMAP engine 300. This methodology assumes that an IBM® X-Force® Exchange threat intelligence platform 380 is utilized and thus, the vulnerability registry interface 310 utilizes an X-Force Exchange API and the threat scoring engine 320 utilizes an X-Force Threat Scoring API.

In operation, the VCMAP engine 300, via the vulnerability registry interface 310 and threat scoring engine 320, queries the X-Force Exchange and Threat Score APIs to pull down CVEs, CVE characteristics, CVE Threat Scores, and consequences of exploitation from the vulnerability registry service 385 of the threat intelligence platform 380. The API output from the X-Force Exchange and Threat Score APIs are combined, mapping CVEs and CVE characteristics with Threat Scores and consequences of exploitation into a vulnerability database 339 by the vulnerability database engine 330, and a linked list data structure by the vulnerability chain graph modeling engine 350. The linked list data structure is ingested into the finite state machine (FSM) engine 340. The FSM engine 340 examines each node in the linked list and builds a Dynamic Acyclic Graph (DAG) by reorganizing the linked list and changing the links between nodes based on CVE properties and threat scores. That is, in some illustrative embodiments, the finite state machine is used to analyze the attack vector, impact on CIA triad, and consequences of exploitation, and associates vulnerabilities based on these characteristics.

The DAG maps of all known CVEs based on CVE characteristics such as attack vector, impact on CIA triad, and consequence of exploitation. That is, all the CVEs in the vulnerability registry service 385 may be linked to each other by way of a many-to-many mapping and correlation of CVE characteristics according to the logic established for identifying initial, intermediate, and final nodes in a vulnerability chain, examples of CVE characteristics indicative of these types of nodes being discussed previously. Thereafter, individual ones of the vulnerability chains may be selected based on a matching to a CVE list 395 provided by an organization for which the organization wants vulnerability chain information and prioritization.

Figure 4:
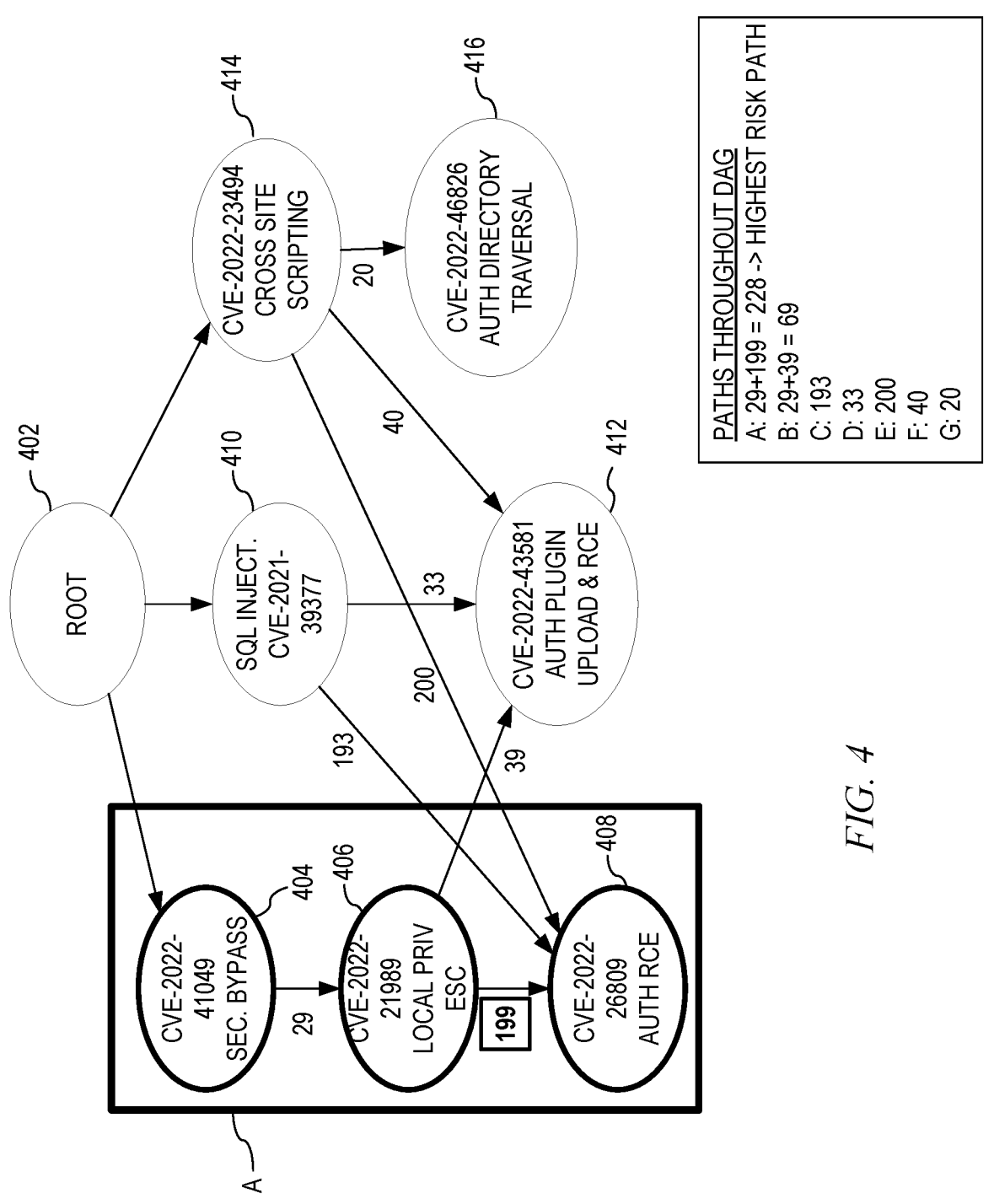
FIG. 4 is an example diagram of a directed acyclic graph of vulnerability chains for an organization computing system in accordance with one illustrative embodiment.

FIG. 4 is an example diagram of a directed acyclic graph of vulnerability chains for an organization computing system in accordance with one illustrative embodiment. As shown in FIG. 4, CVE relationships are represented by a unidirectional arrow that links one CVE to another. A group of CVEs that are connected to one another represent a single vulnerability chain, with the first CVE in the chain being the initial CVE that is exploited, and the last CVE being the vulnerability that is exploited to accomplish the end goal of a bad actor. The edges of the graph represent the combined risk of two connected CVEs. Any suitable scoring algorithm can be used, however it is recommended to use a risk-based scoring system such as X-Force Threat Score, CVSS, or EPSS.

Due to the fact that that the DAG is a tree-like data structure, the mechanisms of the illustrative embodiments can leverage searching algorithms, such as Depth-First-Search and Breadth-First-Search, for example, to quickly enumerate all possible paths throughout the graph and determine the quickest path to take from start to finish. While the quickest path would represent the vulnerability chain that poses the least risk to a system, since the above algorithms enumerate all paths, in some illustrative embodiments, the VCMAP engine 300 is able to identify the vulnerability chain representing the greatest risk to a computing system, e.g., a vulnerability chain with the largest accumulated threat or CVE score, i.e., the greatest vulnerability chain risk, to thereby find the vulnerability chain that poses the greatest risk to the particular computing system, e.g., organization computing system 390, based on a given CVE list 395. That is, each of the vulnerability chains having CVEs matching CVEs in the CVE list 395 may be identified from the DAG, and these enumerated vulnerability chains may be compared to each other based on accumulated threat or VCE score, i.e., vulnerability chain risk, and prioritized. Vulnerability remediation teams, or compliance teams may then use the vulnerability chains that pose the largest risk to drive remediation efforts throughout the organization.

To implement the mechanisms of the VCMAP engine 300, in accordance with some illustrative embodiments, the VCMAP engine 300 utilizes APIs, such as NVD, EPSS, or X-Force Exchange & Ranking APIs, to automatically ingest a comprehensive list of CVEs. The finite state machine engine 340 is then used to associate all CVEs based on CVE characteristics such as attack vector, impact on CIA triad, and consequence of exploitation. Once the association of the CVEs has been completed, any number of libraries may be used to create a Dynamic Acyclic Graph (DAG), such as the Python-based graphlib, for example. The CVEs themselves serve as the nodes of the graph and the edges lining the nodes have the accumulated X-Force Threat Score of the two linked CVEs.

Once the graph has been implemented, the graph searching algorithm, e.g., a Depth-First-Search or Breadth-First-Search algorithm, may be used to enumerate all paths through the DAG. A second finite-state-machine, or other algorithm, may be used at the organization computing system 390 to generate a list of all CVEs 395 that impact the organization's computing system 390. The list of CVEs 395 would propagate throughout the finite state machine of the finite state machine engine 340 and the output would be a list of all vulnerability chains that impact the organization's computing system 390, along with their accumulated threat scores. In some illustrative embodiments, this may be an identification of vulnerability chains where every node in the vulnerability chain matches a CVE in the CVE list 395. In other illustrative embodiments, this may be an identification of vulnerability chains where at least one of the nodes in the vulnerability chain matches a CVE in the CVE list 395. The vulnerability chain graph priority engine 360 can operate to prioritize vulnerability chains, as well as individual vulnerabilities within the vulnerability chains, based on the vulnerability chain risks, vulnerability threat or CVE scores associated with links between nodes, or the like.

Thus, for example, the vulnerability chain graph priority engine 360 may identify the highest risk vulnerability chains for the organizations' computing system 390 and then within the highest risk vulnerability chains, identify the links demonstrating the highest threat scores. This information may be presented to a user at the organization computing system 390, via the DAG and priorities output 397, in a graphical manner, such as a graphical representation of the vulnerability chains in a DAG or graph based manner, such as shown in FIG. 4. The particular vulnerabilities within the highest risk vulnerability chains, i.e., the vulnerabilities that have a link with a highest combined threat or CVE score, may be accentuated in the representation and thereby identify to the organization where remediation efforts should be prioritized.

FIG. 4 is an example diagram of a directed acyclic graph of vulnerability chains for an organization computing system in accordance with one illustrative embodiment. The depiction in FIG. 4 may be a graphical representation of a DAG for CVEs in a CVE list 395 obtained from an organization's computing system 390, for example. That is, a much larger DAG for all the CVEs in the vulnerability registry service 385 may be generated using a many-to-many mapping of CVEs to each other based on CVE characteristics and the established logic for identifying the initial, intermediate, and final nodes in a vulnerability chain as discussed above. For example, CVEs with a local attack vector, or vulnerabilities that result in a security bypass or credential exfiltration may represent the first link in the vulnerability chain, CVEs that result in a privilege escalation, further credential dumping, or data enumeration will serve as intermediate links in the chain, and CVEs that result in authenticated code execution, command injection, or file upload will serve as the final link in the vulnerability chain. This much larger generalized DAG for all the CVEs in the vulnerability registry service 385 may then be matched to the CVEs in the CVE list 395 from the organization computing system 390 to identify a smaller listing of vulnerability chains corresponding to the organization's computing system 390 and the CVE list 395. These vulnerability chains may then be represented in an organization's DAG and priority listing 397, an example of which is shown in FIG. 4, which can be displayed as a graphical representation for use by remediation teams to prioritize their remediation efforts on vulnerability chains and individual vulnerabilities that will break these vulnerability chains.

In the example of FIG. 4, multiple vulnerability chains exist from the root node 402 including the following vulnerability chains A through G of nodes (reference numerals noted):

A—402 to 404 to 406 to 408;
B—402 to 404 to 406 to 412;
C—402 to 410 to 408;
D—402 to 410 to 412;
E—402 to 414 to 408;
F—402 to 414 to 412; and
G—402 to 414 to 416.

The edges along these vulnerability chains have associated weights, or threat scores, that correspond to the accumulated threat or CVE scores of the nodes that they connect, e.g., the link from node 404 to 406 has a threat/CVE score of 29 which is the combination of threat/CVE scores of nodes 404 and 406. Higher threat/CVE scores represent an increased vulnerability, threat, or risk. In this example, the vulnerability chain risk is the combination of the threat/CVE scores of the links that make up the vulnerability chain. Thus, for example, the vulnerability chain risk for vulnerability chain A is 29+199=228.

The vulnerability chain risks of each of the vulnerability chains may be compared to determine which vulnerability chains represent the highest risk and thus, should be prioritized for remediation action. In the depicted example, vulnerability chain A has the highest vulnerability chain risk and thus, has the highest priority, followed by vulnerability chains E, C, B, F, D, and then G. Thus, through the depiction of FIG. 4, remediation teams or other authorized users may quickly identify the highest priority vulnerability chains for remediation actions, e.g., vulnerability chain A, which may be highlighted in the representation so that user's attention is brought to those portions of the displayed DAG in FIG. 4.

In addition, the individual vulnerabilities or CVEs associated with the highest threat vulnerabilities in the vulnerability chain may be identified for remediation actions. Thus, for example, the highest threat/CVE score on a link in vulnerability chain A is the link having score 199 between nodes 406 and 408. This informs remediation teams or authorized personnel that this portion of the vulnerability chain represents the greatest threat to the computing system and thus, remediation actions should be prioritized for this portion of vulnerability chain A to thereby break the vulnerability chain. It should be appreciated that a vulnerability chain may have a much larger chain of nodes than that shown in the example of FIG. 4 and thus, such highlighting and prioritization serves as a significant benefit to target limited remediation resources on the vulnerability chains and vulnerabilities within the vulnerability chains that will have the greatest positive impact on the security of the computing system.

Figure 5:
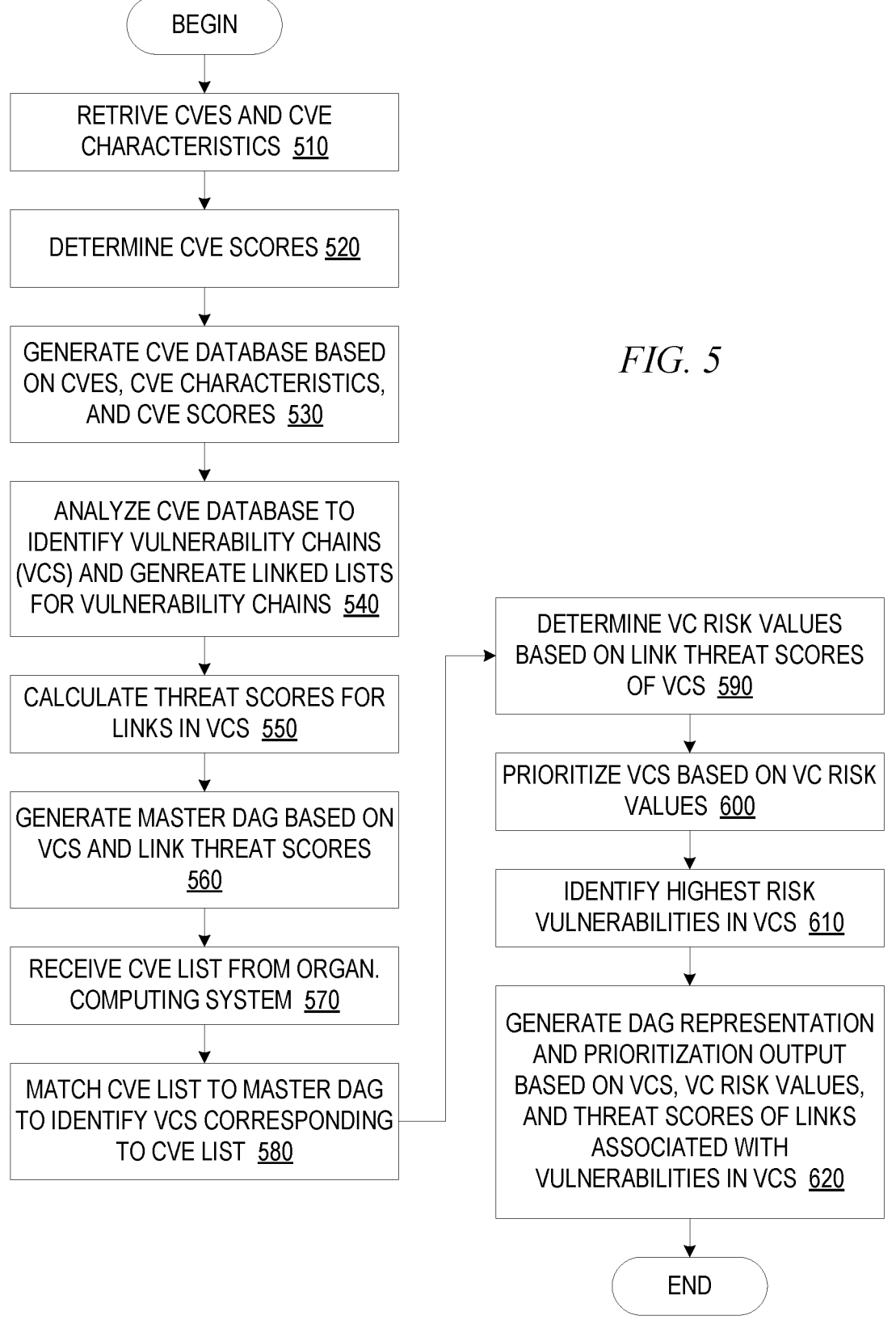
FIG. 5 is a flowchart outlining an example operation for identifying vulnerability chains, generating a vulnerability chain model, and executing the vulnerability chain model on an organization's vulnerability listing in accordance with one illustrative embodiment.

FIG. 5 is a flowchart outlining an example operation for identifying vulnerability chains, generating a vulnerability chain model, and executing the vulnerability chain model on an organization's vulnerability listing in accordance with one illustrative embodiment. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

As shown in FIG. 5, the operation starts by retrieving CVEs and CVE characteristics, for a plurality of vulnerabilities, from a vulnerability registry service (step 510). The CVE scores for the CVEs are determined (step 520) and a database of CVEs and CVE scores is generated (step 530). The CVE database is analyzed to identify vulnerability chains and generate linked lists for each vulnerability chain (step 540). The threat scores for links of the vulnerability chains are calculated based on the threat/CVE scores of the nodes connected by the links (step 550). A master DAG is generated based on the vulnerability chains and calculated links threat scores (step 560).

A CVE list is received from an organizations' computing system (step 570). The CVE list is matched to the master DAG to identify vulnerability chains corresponding to the CVEs in the CVE list (step 580). The vulnerability chain risk values for the matching vulnerability chains is determined based on the combination of link threat scores for the vulnerability chains (step 590). The vulnerability chains are prioritized based on the vulnerability chain risks (step 600) and then a highest risk vulnerability within the vulnerability chains is identified (step 610). A DAG representation and prioritization output is generate based on the identified vulnerability chains, vulnerability chain risks, and the individual threat scores of the links associated with vulnerabilities in the chains (step 620). The operation then terminates.

Thus, the illustrative embodiments provide an improved computing tool and improved computing tool functionality/operations that realizes an efficient mechanism to identify vulnerability chains based on vulnerability registry data made public at the time the vulnerability is discovered and disclosed. The illustrative embodiments provide a visualization tool that graphically represents the vulnerability chains as DAGs with corresponding weights of links indicating the relative severity of vulnerability combinations in vulnerability chains. From the graphical representation of the DAG, other downstream computing systems and computing system processes, or tools, as well as authorized personnel, can analyze the DAG and identify where remedial actions can be taken to maximize the security of a computing system and break vulnerability chains.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for identifying vulnerability chains in a computing system, the method comprising:

retrieving computer system vulnerability characteristics for a plurality of computer system vulnerabilities from a vulnerability registry, wherein the vulnerability registry is an external, standards-based vulnerability registry comprising a repository of publicly disclosed computer system vulnerabilities, the vulnerability registry being distinct from the data processing system;

determining, for each computer system vulnerability, a threat score indicating a level of risk of the vulnerability to security of the computing system;

generating, based on the computer system vulnerability characteristics and the threat score, a directed acyclic graph data structure, wherein the directed acyclic graph (DAG) data structure comprises a plurality of vulnerability chains, wherein each vulnerability chain comprises a plurality of computer system vulnerabilities, represented as nodes of the DAG data structure, linked to each other from a root node to a terminating node, and wherein links of the DAG data structure have weights that are mathematically determined as a function of the threat scores of the two nodes directly connected by the link, such that each link weight is computed based on the threat scores of its adjacent nodes and is not a probability unrelated to those threat scores; and generating a graphical representation of the DAG data structure, wherein the graphical representation of the DAG data structure depicts the weights of the links to thereby represent relative threat of the vulnerabilities linked by the links.

2. The method of claim 1, further comprising identifying a prioritized vulnerability chain, in the plurality of vulnerability chains, having a relatively largest vulnerability chain risk based on the weights of the links of the vulnerability chains, wherein generating the graphical representation of the DAG data structure comprises accentuating the prioritized vulnerability chain in the graphical representation of the DAG data structure.

3. The method of claim 2, further comprising determining, for each vulnerability chain in the DAG data structure, a vulnerability chain risk for the vulnerability chain based on an accumulation of weights of links that are part of the vulnerability chain, and wherein the relatively largest vulnerability chain risk is a vulnerability chain risk of the vulnerability chains in the DAG data structure that has a largest relative value.

4. The method of claim 1, further comprising executing a computer analysis of the DAG data structure to identify a vulnerability chain representing a relatively largest threat to an organization computing system, wherein the computer analysis comprises at least one of a depth-first-search of the DAG data structure or a breadth-first-search of the DAG data structure to enumerate vulnerability chains in the DAG data structure.

5. The method of claim 1, further comprising executing a computer analysis of the DAG data structure to identify a vulnerability chain representing a relatively largest threat to an organization computing system, wherein the computer analysis comprises identifying a relatively longest vulnerability chain in the DAG data structure.

6. The method of claim 1, wherein generating the DAG data structure comprises associating computer system vulnerabilities with each other in a dependency of the DAG data structure based on characteristics of the computer system vulnerabilities, wherein these characteristics comprise at least one of an attack vector, an impact on a confidentiality, integrity, and availability (CIA) triad, or consequences of exploitation of the computer system vulnerability.

7. The method of claim 6, wherein generating the DAG data structure comprises, for each vulnerability chain:

selecting a first computer system vulnerability, having characteristics indicating the first computer system vulnerability is a computer system vulnerability that has a local attack vector, a security bypass, or credential exfiltration, as an initial computer system vulnerability in the vulnerability chain;

selecting one or more second computer system vulnerabilities, having characteristics indicating the one or more second computer system vulnerabilities are computer system vulnerabilities that perform a privilege escalation, credential dumping, or data enumeration, as intermediate computer system vulnerabilities in the vulnerability chain; and selecting a third computer system vulnerability, having characteristics indicating the third computer system vulnerability is a computer system vulnerability that executes authenticated code, performs a command injection, or performs a file upload, as a final computer system vulnerability in the vulnerability chain.

8. The method of claim 1, further comprising:

receiving, from an organization computing system, a vulnerability listing data structure specifying a set of organization computing system vulnerabilities, wherein the set of organization computing system vulnerabilities is a subset of the plurality of computer system vulnerabilities;

matching computer system vulnerabilities in the set of organization computing system vulnerabilities to computer system vulnerabilities specified in the DAG data structure; and identifying vulnerability chains in the DAG data structure corresponding to the set of organization computing system vulnerabilities based on results of the matching, to thereby generate one or more organization vulnerability chains.

9. The method of claim 8, wherein the one or more organization vulnerability chains comprises a plurality of organization vulnerability chains, and wherein the method further comprises prioritizing organization vulnerability chains in the plurality of organization vulnerability chains relative to one another based on vulnerability chain risk values.

10. The method of claim 1, wherein determining, for each computer system vulnerability, the threat score comprises executing a threat scoring algorithm of a threat intelligence platform computing system.

11. A computer program product comprising a computer readable storage medium having a computer readable program stored therein, wherein the computer readable program, when executed on a data processing system, causes the data processing system to:

retrieve computer system vulnerability characteristics for a plurality of computer system vulnerabilities from a vulnerability registry, wherein the vulnerability registry is an external, standards-based vulnerability registry comprising a repository of publicly disclosed computer system vulnerabilities, the vulnerability registry being distinct from the data processing system;

determine, for each computer system vulnerability, a threat score indicating a level of risk of the vulnerability to security of the computing system;

generate, based on the computer system vulnerability characteristics and the threat score, a directed acyclic graph data structure, wherein the directed acyclic graph (DAG) data structure comprises a plurality of vulnerability chains, wherein each vulnerability chain comprises a plurality of computer system vulnerabilities, represented as nodes of the DAG data structure, linked to each other from a root node to a terminating node, and wherein links of the DAG data structure have weights that are mathematically determined as a function of the threat scores of the two nodes directly connected by the link, such that each link weight is computed based on the threat scores of its adjacent nodes and is not a probability unrelated to those threat scores; and generate a graphical representation of the DAG data structure, wherein the graphical representation of the DAG data structure depicts the weights of the links to thereby represent relative threat of the vulnerabilities linked by the links.

12. The computer program product of claim 11, wherein the computer readable program further causes the data processing system to identify a prioritized vulnerability chain, in the plurality of vulnerability chains, having a relatively largest vulnerability chain risk based on the weights of the links of the vulnerability chains, wherein generating the graphical representation of the DAG data structure comprises accentuating the prioritized vulnerability chain in the graphical representation of the DAG data structure.

13. The computer program product of claim 12, wherein the computer readable program further causes the data processing system to determine, for each vulnerability chain in the DAG data structure, a vulnerability chain risk for the vulnerability chain based on an accumulation of weights of links that are part of the vulnerability chain, and wherein the relatively largest vulnerability chain risk is a vulnerability chain risk of the vulnerability chains in the DAG data structure that has a largest relative value.

14. The computer program product of claim 11, wherein the computer readable program further causes the data processing system to execute a computer analysis of the DAG data structure to identify a vulnerability chain representing a relatively largest threat to an organization computing system, wherein the computer analysis comprises at least one of a depth-first-search of the DAG data structure or a breadth-first-search of the DAG data structure to enumerate vulnerability chains in the DAG data structure.

15. The computer program product of claim 11, wherein the computer readable program further causes the data processing system to execute a computer analysis of the DAG data structure to identify a vulnerability chain representing a relatively largest threat to an organization computing system, wherein the computer analysis comprises identifying a relatively longest vulnerability chain in the DAG data structure.

16. The computer program product of claim 11, wherein generating the DAG data structure comprises associating computer system vulnerabilities with each other in a dependency of the DAG data structure based on characteristics of the computer system vulnerabilities, wherein these characteristics comprise at least one of an attack vector, an impact on a confidentiality, integrity, and availability (CIA) triad, or consequences of exploitation of the computer system vulnerability.

17. The computer program product of claim 16, wherein generating the DAG data structure comprises, for each vulnerability chain:

selecting a first computer system vulnerability, having characteristics indicating the first computer system vulnerability is a computer system vulnerability that has a local attack vector, a security bypass, or credential exfiltration, as an initial computer system vulnerability in the vulnerability chain;

selecting one or more second computer system vulnerabilities, having characteristics indicating the one or more second computer system vulnerabilities are computer system vulnerabilities that perform a privilege escalation, credential dumping, or data enumeration, as intermediate computer system vulnerabilities in the vulnerability chain; and selecting a third computer system vulnerability, having characteristics indicating the third computer system vulnerability is a computer system vulnerability that executes authenticated code, performs a command injection, or performs a file upload, as a final computer system vulnerability in the vulnerability chain.

18. The computer program product of claim 11, wherein the computer readable program further causes the data processing system to:

receive, from an organization computing system, a vulnerability listing data structure specifying a set of organization computing system vulnerabilities, wherein the set of organization computing system vulnerabilities is a subset of the plurality of computer system vulnerabilities;

match computer system vulnerabilities in the set of organization computing system vulnerabilities to computer system vulnerabilities specified in the DAG data structure; and identify vulnerability chains in the DAG data structure corresponding to the set of organization computing system vulnerabilities based on results of the matching, to thereby generate one or more organization vulnerability chains.

19. The computer program product of claim 18, wherein the one or more organization vulnerability chains comprises a plurality of organization vulnerability chains, and wherein the method further comprises prioritizing organization vulnerability chains in the plurality of organization vulnerability chains relative to one another based on vulnerability chain risk values.

20. An apparatus comprising:

at least one processor; and at least one memory coupled to the at least one processor, wherein the at least one memory comprises instructions which, when executed by the at least one processor, cause the at least one processor to:

retrieve computer system vulnerability characteristics for a plurality of computer system vulnerabilities from a vulnerability registry, wherein the vulnerability registry is an external, standards-based vulnerability registry comprising a repository of publicly disclosed computer system vulnerabilities, the vulnerability registry being distinct from the data processing system;

determine, for each computer system vulnerability, a threat score indicating a level of risk of the vulnerability to security of the computing system;

generate, based on the computer system vulnerability characteristics and the threat score, a directed acyclic graph data structure, wherein the directed acyclic graph (DAG) data structure comprises a plurality of vulnerability chains, wherein each vulnerability chain comprises a plurality of computer system vulnerabilities, represented as nodes of the DAG data structure, linked to each other from a root node to a terminating node, and wherein links of the DAG data structure have weights that are mathematically determined as a function of the threat scores of the two nodes directly connected by the link, such that each link weight is computed based on the threat scores of its adjacent nodes and is not a probability unrelated to those threat scores; and generate a graphical representation of the DAG data structure, wherein the graphical representation of the DAG data structure depicts the weights of the links to thereby represent relative threat of the vulnerabilities linked by the links.

\* \* \* \* \*